United States Patent
Kamiyama et al.

Patent Number: 5,608,017
Date of Patent: Mar. 4, 1997

[54] SUSPENSION POLYMERIZATION METHOD

[75] Inventors: Masafumi Kamiyama; Masahiro Maeda; Hiroki Totsuka; Akihiro Sano, all of Shizuoka, Japan

[73] Assignee: Tomoegawa Paper Co., Ltd., Japan

[21] Appl. No.: 449,250

[22] Filed: May 24, 1995

Related U.S. Application Data

[62] Division of Ser. No. 184,772, Jan. 21, 1994, which is a continuation of Ser. No. 9,681, Jan. 27, 1993, abandoned.

[30] Foreign Application Priority Data

Jan. 29, 1992 [JP] Japan ................................. 4-036936

[51] Int. Cl.$^6$ ............................................. C08F 2/18
[52] U.S. Cl. ................... 526/88; 526/317.1; 526/329.7; 526/344.2; 526/347.2; 526/348
[58] Field of Search ................... 526/88, 317.1, 526/329.7, 344.2, 347.2, 348

[56] References Cited

U.S. PATENT DOCUMENTS

| | | | |
|---|---|---|---|
| Re. 21,245 | 10/1939 | Denton | 18/53 |
| 4,248,746 | 2/1981 | Greiner | 260/23 |
| 5,139,915 | 8/1992 | Moffat | 430/110 |

FOREIGN PATENT DOCUMENTS

| | | |
|---|---|---|
| 0443609 | 8/1991 | European Pat. Off. . |
| 443609 | 8/1991 | European Pat. Off. . |
| 343402 | 2/1991 | Japan . |
| 356501 | 3/1991 | Japan . |

Primary Examiner—Thomas R. Weber
Attorney, Agent, or Firm—Thompson Hine & Flory LLP

[57] ABSTRACT

The present invention provides a suspension polymerization method for producing a polymerized particle having cavities in the particle. The method includes the steps of: placing a continuous phase component of an aqueous medium in a continuous phase vessel and a dispersed phase component composed of a monomer composition and a liquid noncompatible to the monomer composition, wherein the liquid noncompatible to the monomer composition is suspended in the monomer composition, in a dispersed phase vessel; subsequently supplying continuously and simultaneously each of the dispersed phase component and the continuous phase component to an apparatus for providing a shear force; subsequently exerting a shear force on the dispersed phase component and the continuous component to form a suspension material including polymerizable liquid-drops of a desired size; subsequently leading the suspension material to a polymerization vessel; subsequently subjecting the suspension material in the polymerization vessel to a polymerization reaction to form a polymerized material; and subsequently drying the polymerized material to obtain the polymerized particle having the cavities in the particle.

20 Claims, 2 Drawing Sheets

SUSPENSION POLYMERIZATION METHOD

This is a division of application Ser. No. 08/184,772, filed Jan. 21, 1994 which is a continuation of application Ser. No. 08/009,681, filed Jan. 27, 1993, now abandoned.

BACKGROUND OF THE INVENTION

1. Field of the invention

The present invention relates no a suspension polymerization method, which is an improved method for producing polymerized particles suitable for use in the particles technology, such as space-retention agents, lubricity providing agents, functional carriers, mono-disperse particles having surface activity, standardization particles, toners, and functional fillers for providing fluidity and/or polishing properties to a paint base. The present invention pertains especially to a method for producing polymerized particles having a cavity structure containing plural cavities in the particle interior by a suspension polymerization method. The present invention also relates to a polymerized particles having a cavity structure containing plural cavities.

2. Prior Art

Heretofore, the above-mentioned polymerized particles, utilized in the particles technology for their particle functionalities, have been mainly produced by an emulsion polymerization method or a dispersion polymerization method.

The emulsion polymerization method has drawbacks as follows: (1) It is difficult to remove non-negletable impurities such as an emulsifying agent and the like; and (2) It is difficult to obtain particle sizes of 1 μm or larger. The dispersion polymerization method has disadvantages such that: (1) production of the polymerized particles is an extremely costly process; and (2) mass production is inadequate because of the complexities of the method.

In order to solve the problems in the emulsion polymerization method and dispersion polymerization method described above, the present inventors have proposed a suspension polymerization method for producing a polymer powder of uniform polymer particles and the desired particle size, as disclosed in Japanese Patent Application First Publication Nos. 3-43,402 and 3-56,501. The proposed suspension polymerization method comprises the steps of:

(a) placing a dispersed phase component of a monomer composition and a continuous phase component of an aqueous medium, respectively, in two separate vessels; (b) supplying continuously and simultaneously each of the dispersed phase component and the continuous phase component in the individual vessels via the individual paths to a shearing device; (c) exerting a shear force on the dispersed phase component and the continuous component to form a dispersed material having liquid-drops of the desired size; and (d) subjecting the dispersed material to a polymerization reaction in a polymerization vessel to form a polymerized particle.

Recently, it has been desirable for polymerized particles formed using the suspension polymerization method to possess a high functionality. For example, in toner particles for electrophotocopier, the fluidity and triboelectric charging properties of the toner depend on the shape of the toner particles. Simply supplying spherical toner particles does not always ensure that all of the desired properties will be provided to the toner. Therefore, a need is to produce polymerized particles possessing improved functionalities by virtue of the specific particle shape such as an irregular shape, an internal cavity structure, or the like.

However, the interior structure of the uniformly spherical polymerized particles produced by the conventional suspension polymerization method as shown in Japanese Patent Application First Publication Nos. 3-43,402 and 3-56,501 is composed of a monomer composition as a main ingredient, and the conventional suspension polymerization method cannot provide a polymerized particle having miscellaneous shapes and a cavity structure in the particle.

SUMMARY OF THE INVENTION

It is therefore an objective of the present invention to provide a polymerized particle having a cavity structure in the particle and a suspension polymerization method for producing the same. The polymerized particle according to the present invention includes, for example, a fusable and crushable particle, a particle having a reduced specific gravity, and/or a functional particle such as a microcapsule, all of which have been in demand in regards to particle technology.

A first aspect of the present invention is directed to providing a suspension polymerization method for producing a polymerized particle containing cavities in the particle comprising the steps of:

preparing a continuous phase component of an aqueous medium;

preparing a dispersed phase component composed of a monomer composition and a liquid noncompatible to the monomer composition wherein the liquid noncompatible to the monomer composition is suspended in the monomer composition;

preparing suspension-polymerization means including: a continuous phase vessel for holding a continuous phase component; a dispersed phase vessel for holding a dispersed phase component; shearing means for providing a shear force; and a polymerization vessel for polymerization reaction;

subsequently placing the continuous phase component in the continuous phase vessel and the dispersed phase component in the dispersed phase vessel;

subsequently supplying continuously and simultaneously each of the dispersed phase component and the continuous phase component separately to the shearing means for providing a shear force;

subsequently exerting a shear force on the dispersed phase component and the continuous component in the shearing means to form a suspension material including polymerizable liquid-drops of a desired size;

subsequently leading the suspension material to the polymerization vessel;

subsequently subjecting the suspension material in the polymerization vessel to a polymerization reaction to form a polymerized material; and subsequently drying the polymerized material to obtain the polymerized particle having the cavities in the particle.

A second aspect of the present invention is directed to providing a polymerized particle which includes a cavity structure containing cavities in the particle.

The above objectives and effects, features, and advantages of the present invention will become more apparent from the following description of specific examples thereof.

DETAILED DESCRIPTION OF THE INVENTION

The suspension polymerization method according to the present invention will be explained by reference to FIGS. 1 and 2.

Figure 1:
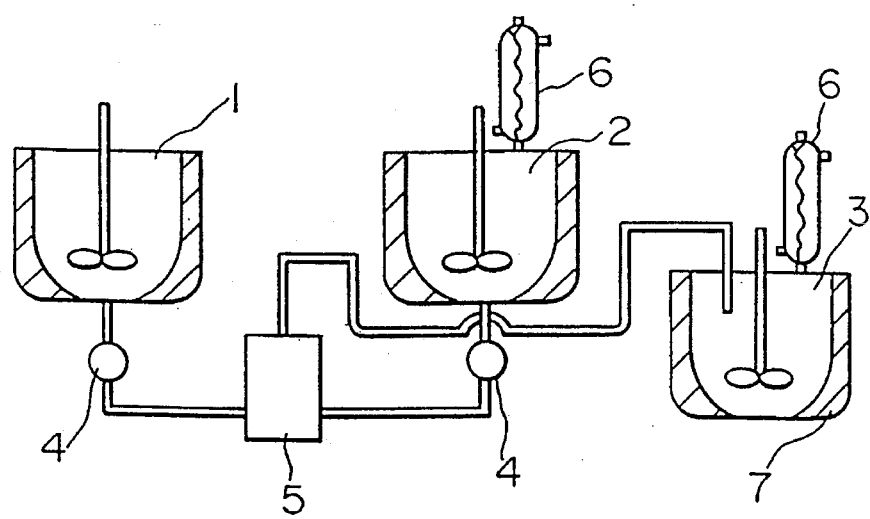
FIG. 1 is a schematic view showing an example of a device for suspension polymerization employed in the present invention.

As shown in FIG. 1, a device for suspension polymerization comprises: a continuous phase vessel 1 for holding a continuous phase component; a dispersed phase vessel 2 for holding a dispersed phase component; a granulator 5; and a polymerization vessel 3 equipped with a condenser 6. The device is designed so that each of the continuous phase component and the dispersed phase component is simultaneously and continuously introduced into the granulator 5 via a volumetric pump 4 in a predetermined flow ratio of the two components. In the granulator 5, a shear force is exerted on each component to form a suspension. The suspension is guided to the polymerization vessel 3 and then subjected to a polymerization reaction. The polymerization reaction is completed by heating the suspension using a jacket heater 7 provided around the outer periphery of the polymerization vessel 3, so as to produce polymerized particles of a fine particle size and a narrowed distribution.

According to the present invention, a polymerized particle having a cavity structure in the particle, which cannot be obtained in the conventional suspension polymerization method, can be produced by mixing a monomer composition and a liquid noncompatible to the monomer composition in the dispersed phase vessel 2.

In the present invention, a monomer composition and a liquid noncompatible to the monomer composition are mixed and stirred in the dispersed phase vessel 2, so that plural drops of the liquid noncompatible to the monomer composition are included in the monomer composition to afford a suspended dispersed phase component. Each of the suspended dispersed phase component and the continuous phase component is individually supplied to the granulator 5, and a shear force is exerted thereon to form a suspension. The suspension is subjected to a polymerization reaction to provide a polymerized particle housing plural drops of the liquid noncompatible to the monomer composition in the particle. As neccesary, the polymerized particle having plural drops of the liquid in the particle is subjected to a heat treatment, resulting in a polymerized particle having a cavity structure containing cavities in the particle. In the present invention, "cavities" means either empty cavities or liquid-filled cavities.

Figure 2:
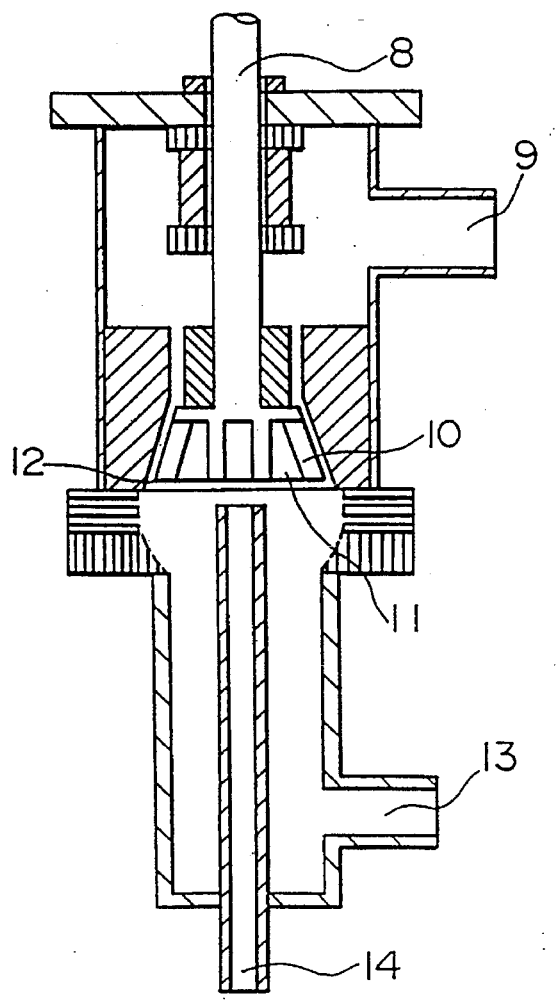
FIG. 2 is a schematic view showing an example of a granulator employed in the present invention.

One example of the granulator 5 is shown in FIG. 2. The granulator 5 comprises: a supply port for a dispersed phase 14; a supply pore for a continuous phase 13 a shear region 11; a rotation axis 8; stirrer blades 10 spacing 12 for regulating the discharge of the suspension; and a discharge opening 9 for discharging the suspension. The stirrer blades 10 are fixed to the rotation axis 8 at the shear region 11 where each of the continuous phase component and the dispersed phase component is to be introduced. The stirrer blades 10 are rotated by rotating the rotation axis 8 and the suspension composed of the continuous phase component and the dispersed phase component is produced at the shear region 11 by virtue of the shear force. The suspension passing through the spacing 12 disposed around the peripheral end portion of the shear region 11 is discharged from the discharge opening 9 and then guided to the polymerization vessel 3.

The dispersed phase component according to the present invention is composed of a monomer composition and a (suspended) liquid noncompatible to the monomer composition.

As a monomer composition, the following polymerizable monomers can be employed: styrene; a styrene derivative including o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, or the like; an ethylene unsaturated mono-olefin including ethylene, propylene, butylene, isobutylene, or the like; a halogenated vinyl compound including vinyl chloride, vinylidene chloride, vinyl bromide, vinyl fluoride, or the like; an organoacidic vinyl ester including vinyl acetate, vinyl propionate, vinyl benzoate, or the like; methacrylic acid; a methacrylic acid derivative including methyl methacrylate, ethyl methacrylate, propyl methacrylate, n-butyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, or the like; acrylic acid; an acrylic acid derivative including methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, or the like; a vinyl ether including vinyl methyl ether, vinyl ethyl ether, vinyl isobutyl ether, or the like; a vinyl ketone including vinyl methyl ketone, vinyl hexyl ketone, vinyl isopropenyl ketone, or the like; an N-vinyl compound including N-vinyl pyrrole, N-vinyl carbazole, N-vinyl indole, N-vinyl pyrrolidone, or the like; a vinyl naphthalene; or a polymerizable monomer including acrylonitrile, methacrylonitrile, acrylamido, or the like.

These monomers may be employed alone or as a mixture thereof, as required.

As a liquid noncompatible to the monomer composition, water, a liquid paraffin, a polyvinyl alcohol, glycerin, or the like is acceptable. In the present invention, a combination between (a) a monomer composition consisting of styrene and the derivative of the same and methacrylic acid and the derivative of the same and (b) water as a liquid noncompatible to the monomer composition is preferable, since this combination contributes toward obtaining a polymerized particle having an adequate cavity structure in the particle. In addition, water is acceptable in view of price, handling, and safety.

In order to provide additional functionalities to a polymerized particle, supplementary materials can be dispersed in the dispersed phase. The supplementary materials include various organic and inorganic pigments such as carbon black, dyes, resin additives, organic compounds, and the like.

The continuous phase is formed by a continuous phase component of an aqueous medium. It is preferable that a suspension stabilizer be included in the continuous phase.

As the suspension stabilizer, water soluble polymers having both hydrophilic groups and hydrophobic groups in the molecule thereof are mainly employed. The suspension stabilizer has both (a) polar groups such as a hydroxy group, a carboxyl group and the salt of the same, a sulfonyl group and the salt of the same, and the like as the hydrophilic group, and (b) aliphatic and aromatic non-polar groups as the hydrophobic group. The suspension stabilizer is selected from the compounds having the abilities to prevent the monomer composition particles formed in the granulation step from composing one another and, to stabilize the particles.

An example of the suspension stabilizer includes a polyvinyl alcohol, a casein, a gelatin, a cellulose derivative such as methyl cellulose, methylhydroxypropyl cellulose, ethyl cellulose, or the like, starch and the derivative of the same, a polymethacrylic acid and the salt of the same, or the like. An inorganic powder such as calcium phosphate, fine-grained silica, or the like is often employed as the suspension stabilizer. The suspension stabilizer acts to prevent the liquid-drops from composing and gathering one another by virtue that the surfaces of the liquid-drops are covered with the stabilizer during a polymerization step. In addition, as an auxiliary of the stabilizer, a surfactant such as sodium dodecyl sulfonate, sodium dodecylbenzene sulfonate, or the like can be employed.

[EXAMPLES]

The present invention will be explained in detail hereinbelow with reference to the examples. In the examples, all "parts" are "parts by weight", unless indicated otherwise.

Example 1

As a continuous phase component, an aqueous solution of 1% of a polyvinyl alcohol (produced by Tokyo Kasei Co., Ltd., Polymerization degree: approximately 2,000, Saponification degree: approximately 80%), 3% of sodium sulfate, and 0.01% of ammonium persulfate was prepared.

A dispersed phase component was prepared as follows: 400 g of carbon black (produced by Mitsubishi Kasei Co., Ltd., "MA-100") was dispersed in a solution of 15 g of 2,2'-azobis(isobutyronitrile) dissolved in a mixture of 4,000 g of styrene and 1,000 g of butyl acrylate, in a dispersed phase vessel 2 shown in FIG. 1 using an ultrasonic dispersing device. 2,000 g of ion exchanged water was added in the dispersed phase vessel 2, and then stirred with a stirrer, having turbine blades, at 500 rpm to obtain a suspension wherein water was dispersed in the monomer composition.

The dispersed phase component and the continuous phase component were separately supplied at a flow rate of 100 ml/min. and at a flow rate of 400 ml/min., respectively, for 10 minutes to a granulator 5 equipped with a rotation part having a diameter of 50 mm. The dispersed phase component and the continuous phase component were mixed and stirred at 10,000 rpm to obtain a dispersion of the dispersed phase component and the continuous phase component. The dispersion was introduced into a polymerization vessel 3 shown in FIG. 1 while stirring at 300 rpm, wherein a polymerization reaction was then carried out for 8 hours.

Figure 3:
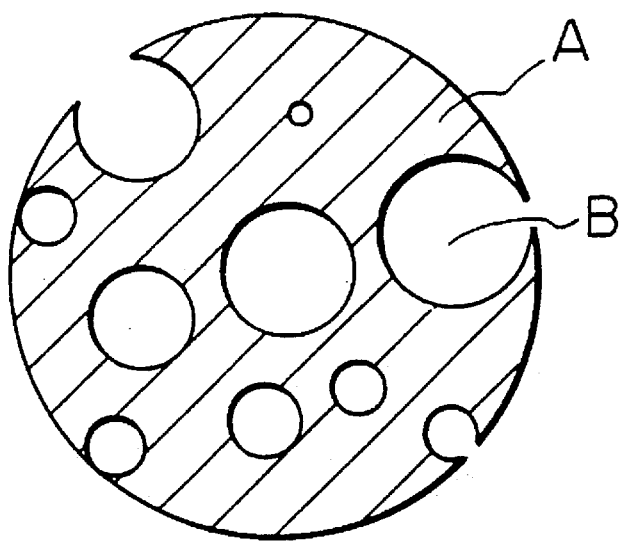
FIG. 3 is an illustration of a thin section of a polymerized particle obtained by a suspension polymerization method according to the present invention.

The reaction product was subjected to a separation treatment with a centrifuge in order to remove a liquid part, and then dried using hot dry air to obtain a polymerized particle according to the present invention. Observations under scanning electron microscope showed that the particle had plural cavities. Furthermore, after the particle was sliced using a microtome, the obtained thin section was observed under a scanning electron microscope, confirming that the polymerized particle A had plural cavities B in the particle, as shown in FIG. 3.

Example 2

A polymerized particle according to the present invention was obtained by repeating the same steps disclosed in Example 1, except that 500 g of glycerin was employed instead of 2,000 g of ion exchanged water in Example 1.

Observation under a scanning electron microscope showed that the particle had plural cavities. Furthermore, after the particle was sliced using a microtome, the obtained thin section was observed under a scanning electron microscope, confirming that the polymerized particle A had plural cavities B in the particle, as shown in FIG. 3.

Example 3

A polymerized particle according to the present invention was obtained by repeating the same steps disclosed in Example 1, except that 250 g of liquid paraffin was employed instead of 2,000 g of ion exchanged water in Example 1.

Observation under a scanning electron microscope showed that the particle had plural cavities. Furthermore, after the particle was sliced using a microtome, the obtained thin section was observed under a scanning electron microscope, confirming that the polymerized particle A had plural cavities B in the particle, as shown in FIG. 3.

Comparative Example 1

A comparative polymerized particle was obtained by repeating the same steps disclosed in Example 1, except that the step of adding ion exchanged water to the dispersed phase component was omitted.

Observation under a scanning electron microscope showed that the particle had a smooth surface and no cavities. Furthermore, after the comparative particle was sliced using a microtome, the obtained thin section was observed under a scanning electron microscope, confirming that the comparative polymerized particle had no cavities in the particle.

As will be apparent from the results shown in Examples 1 to 3 and Comparative Example 1, the present invention enables to provide a method for producing a polymerized particle having a cavity structure in the particle by a suspension polymerization.

The present invention has been described in detail with respect to examples, and it should now be apparent from the foregoing, to those skilled in the art, that changes and modifications may be made without departing from the invention in its broader aspects, and it is the intention, therefore, in the appended claims to cover all such changes and modifications that fall within the true spirit of the invention.

What is claimed is:

1. A suspension polymerization method for producing a polymerized particle comprising the steps of:

preparing a continuous phase component comprising an aqueous medium;

preparing a dispersed phase component comprising (a) a monomer composition and (b) a liquid noncompatible with the monomer composition wherein the liquid noncompatible with the monomer composition is suspended in the monomer composition;

preparing suspension-polymerization means including: a continuous phase vessel for holding a continuous phase component; a dispersed phase vessel for holding a dispersed phase component; shearing means for providing a shear force; and a polymerization vessel for polymerization reaction;

subsequently placing the continuous phase component in the continuous phase vessel and the dispersed phase component in the dispersed phase vessel;

subsequently supplying continuously and simultaneously each of the dispersed phase component and the continuous phase component separately to the shearing means for providing a shear force;

subsequently exerting a sheer force on the dispersed phase component and the continuous component in the shearing means to form a suspension material including polymerizable liquid-drops of a desired size;

subsequently leading the suspension material to the polymerization vessel;

subsequently subjecting the suspension material in the polymerization vessel to a polymerization reaction to form a polymerized material; and subsequently drying the polymerized material to obtain the polymerized particle, said polymerized particle characterized as having cavities in the particle.

2. A suspension polymerization method as recited in claim 1, wherein the monomer composition in the dispersed phase component comprises at least one monomer selected from the group consisting of: styrene; a styrene derivative; an ethylenically unsaturated mono-olefin; a halogenated vinyl compound; an organoacidic vinyl ester; methacrylic acid; a methacrylic acid derivative; acrylic acid; an acrylic acid derivative; a vinyl ether; a vinyl ketone; an N-vinyl compound; a vinyl naphthalene; acrylonitrile; methacrylonitrile; acrylamido; and mixtures thereof.

3. A suspension polymerization method as recited in claim 1, wherein the liquid noncompatible to the monomer composition in the dispersed phase component comprises at least one material selected from the group consisting of: water; a liquid paraffin; a polyvinyl alcohol; and glycerin.

4. A suspension polymerization method as recited in claim 1, wherein the dispersed phase component comprises a suspension of (a) a monomer composition comprising styrene, a styrene derivative, methacrylic acid, a methacrylic acid derivative acrylic acid, an acrylic acid derivative, and mixture thereof, and (b) a liquid non-compatible with said monomer, said liquid being selected from the group consisting of water, a liquid paraffin, and glycerin.

5. A suspension polymerization method as recited in claim 1, wherein the dispersed phase component further includes at least one material selected from the group consisting of: carbon black; an organic pigment; an inorganic pigment; a dye; a resin additive; and an organic compound.

6. A suspension polymerization method as recited in claim 1, wherein the continuous phase component further comprises a suspension stabilizer having both at least one hydrophilic group and at least one hydrophobic group in a molecule of the stabilizer.

7. A suspension polymerization method as recited in claim 6, wherein the suspension stabilizer is a material selected from the group consisting of: a polyvinyl alcohol; a casein; a gelatin; a cellulose derivative; a starch; a starch derivative; a polymethacrylic acid; a salt of the polymethacrylic acid; calcium phosphate; and fine-grained silica.

8. A suspension polymerization method as recited in claim 4, wherein said monomer composition comprises styrene and butyl acrylate.

9. A suspension polymerization method as recited in claim 8, wherein said noncompatible liquid is water.

10. A suspension polymerization method as recited in claim 8, wherein said noncompatible liquid is a liquid paraffin.

11. A suspension polymerization method as recited in claim 8, wherein said noncompatible liquid is polyvinyl alcohol.

12. A suspension polymerization method as recited in claim 8, wherein said noncompatible liquid is glycerin.

13. A suspension polymerization method as recited in claim 9, wherein said noncompatible liquid is ion-exchanged water.

14. A suspension polymerization method as recited in claim 1, wherein said dispersed phase further comprises a polymerization initiator.

15. A suspension polymerization method as recited in claim 14, wherein said polymerization initiator is 2,2'-azobis(isobutyionitrile).

16. A suspension polymerization method as recited in claim 5, wherein said supplementary material is carbon black.

17. A suspension polymerization method as recited in claim 1, wherein said cavities are formed in the surface of said particles, are enclosed in the interior of said particle, or a combination thereof.

18. A suspension polymerization method as recited in claim 17, wherein at least a portion of said cavities are enclosed in the interior of said particle and at least a portion of said enclosed cavities contain liquid not compatible with said monomer.

19. A suspension polymerization method as recited in claim 18, wherein said at least a portion of said enclosed cavities are filled with said liquid non-compatible with said monomer.

20. A suspension polymerization method for producing a polymerized particle comprising the steps of:

providing an aqueous medium for a continuous phase component;

providing a suspension containing a monomer composition in which a liquid non-compatible with the monomer composition is suspended, for a dispersed phase component;

preparing suspension-polymerization means including: a continuous phase vessel for holding a continuous phase component; a dispersed phase vessel for holding a dispersed phase component; shearing means for providing a shear force; and a polymerization vessel for polymerization reaction;

subsequently placing the continuous phase component in the continuous phase vessel and the dispersed phase component in the dispersed phase vessel;

subsequently supplying continuously and simultaneously each of the dispersed phase component and the continuous phase component separately to the shearing means for providing a shear force;

subsequently exerting a shear force on the dispersed phase component and the continuous component in the shearing means of form a suspension material including polymerizable liquid-drops of a desired size;

subsequently leading the suspension material to the polymerization vessel;

subsequently subjecting the suspension material in the polymerization vessel to a polymerization reaction to form a polymerized material; and subsequently drying the polymerized material to obtain the polymerized particle, said polymerized particle characterized as containing cavities, said cavities being formed in the particle surface, enclosed in the particle interior, or a combination thereof, wherein said cavities enclosed in the particle interior are empty cavities, cavities containing liquid non-compatible with the monomer, or a combination of empty cavities and cavities containing liquid non-compatible with said monomer.

* * * * *